United States Patent [19]
Duchaine

[11] 4,368,930
[45] Jan. 18, 1983

[54] GUIDING DEVICE PROVIDED WITH GUIDE-BLOCKS

[75] Inventor: Pierre J. M. Duchaine, Ville D'Avray, France

[73] Assignee: Centre d'Etudes et de Recherches de la Machine-Outil (C.E.R.M.O.), France

[21] Appl. No.: 161,518

[22] Filed: Jun. 20, 1980

Related U.S. Application Data

[63] Continuation of Ser. No. 960,854, Nov. 15, 1978, abandoned.

[30] Foreign Application Priority Data

Nov. 30, 1977 [FR] France .................. 77 36136

[51] Int. Cl.³ .................. F16C 29/02; F16C 32/06
[52] U.S. Cl. .................. 308/5 R; 384/121
[58] Field of Search .......... 308/5 R, DIG. 1, 9, 308/160, 170

[56] References Cited

U.S. PATENT DOCUMENTS

| | | | |
|---|---|---|---|
| 3,137,530 | 6/1964 | Kohler | 308/5 R |
| 3,424,505 | 1/1969 | Pizzitola | 308/73 |
| 3,658,393 | 4/1972 | Luthi | 308/5 R |
| 3,744,858 | 7/1973 | Weichsel | 308/DIG. 1 |
| 3,799,628 | 3/1974 | Van Gaasbeek et al. | 308/5 R |
| 3,871,721 | 3/1975 | Siebert | 308/5 |
| 3,973,810 | 8/1976 | Montag | 308/DIG. 1 |
| 3,992,978 | 11/1976 | Peterson | 91/47 |
| 3,994,540 | 11/1976 | Peterson | 308/3 R |
| 4,099,802 | 7/1978 | Heinemann et al. | 308/5 R |
| 4,114,959 | 9/1978 | Christ | 308/5 R |

FOREIGN PATENT DOCUMENTS 2340470 10/1977 France .
1318066 6/1973 United Kingdom .

Primary Examiner—Richard R. Stearns
Attorney, Agent, or Firm—Lewis H. Eslinger

[57] ABSTRACT

A guiding device comprises a support, including a first substantially planar guiding surface; a movable body adapted to be guided on the support, and including a second substantially planar guiding surface; and a plurality of hydrostatic guide blocks disposed between the first and second guiding surfaces, each guide block including a first hydrostatic bearing portion connected to a source of pressurized fluid for slidably connecting either the movable body or the support to the respective guide block, and a second hydrostatic bearing portion connected to the source of pressurized fluid for slidably connecting the other of the movable body and the support to the respective guide block, and in which each of the first and second bearing portions includes a flow restriction for restricting the flow of fluid from the source of pressurized fluid to the respective bearing portion, whereby fluid flows from the source to the first bearing portion without passing through the second bearing portion and fluid flows from the source to the second bearing portion without passing through the first bearing portion.

2 Claims, 5 Drawing Figures

GUIDING DEVICE PROVIDED WITH GUIDE-BLOCKS

This is a continuation, of application Ser. No. 960,854, filed Nov. 15, 1978, now abandoned.

Attempts have been made to apply the technique of hydrostatic supports to the production of plane guides.

But it was noted that whenever the moving body and the guide supporting it have large dimensions, the guiding becomes faulty. This is due to an insufficient rigidity of the guide of which the deflection results in the elimination of the support of some of the many stationary hydrostatic guide-blocks inserted between the guide and the said body.

It can be noted on this point that the aforesaid problem does not arise in productions comprising only a small number of hydrostatic guide-blocks rigidly fitted in one of the parts. Thus, with only one guide-block, it is obvious that this guide-block can but rest against the surface placed opposite.

It is the object of the invention to overcome the disadvantages occurring with the known productions and to apply to those assemblies which comprise a plurality of guide-blocks the dispositions proper to special hydrostatic guide-blocks, the fitting of which is adapted so as to ensure a good performance by each guide-block.

The object of the invention is therefore a guide device with guide-blocks for guiding a moving body on a support, comprising at least two substantially plane guiding surfaces belonging, one to the said body, the other to the said support, whereas a plurality of hydrostatic guide-blocks are provided between these two surfaces, each guide-block being constituted by an hydrostatic support member mounted to oscillate on a first of the two parts—moving body and support—by elastic return means which hold it in its hydrostatic support position on the guiding surface provided on the second of the said two parts.

The said elastic return means are constituted by a cavity provided in the first part, wherein the hydrostatic support member is partly introduced, by a hydrostatic span formed by the bottom of the cavity and one face of the said support member placed opposite by an enclosure defined by the middle of the said face and the said bottom part and by a source of pressurized fluid connected to the said enclosure with insertion of a restriction.

The invention will be better understood, and secondary characteristics and advantages will become apparent on reading the following description of embodiments given by way of example and non-restrictively, reference being made to the accompanying drawings in which.

Figure 1:
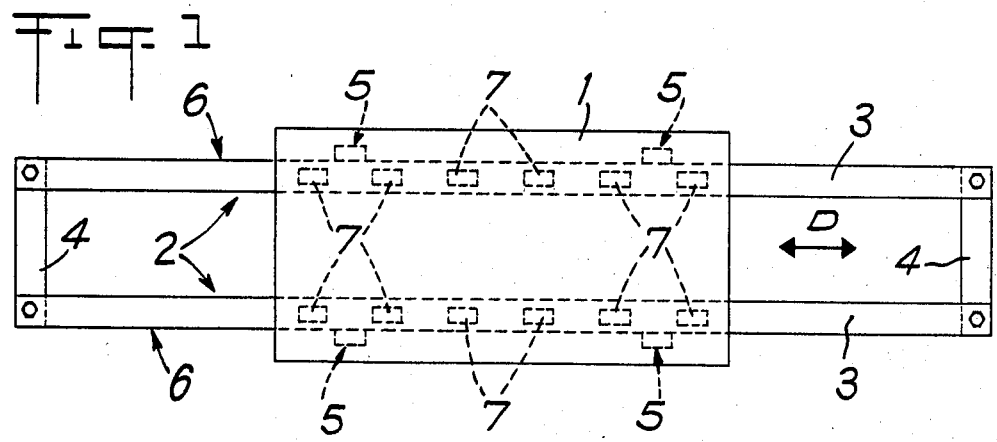
FIG. 1 is a plan view of an assembly provided with guide devices according to the invention.

FIG. 1 shows a body 1 such as a moving table of a machine-tool, mounted to slide in the direction D on two guide ways 2. The upper faces 3 of these guide ways 2 are parallel, whilst the two guide ways are joined by cross-pieces 4. Vertical guide-blocks 5 laterally guide the body 1 whilst resting against the vertical faces 6 of the guide ways 2. Moreover, a plurality of horizontal guide-blocks 7, mounted in the body 1, are supported by the upper faces 3 of the guide ways. In the example shown, the number of these guide-blocks 7 equals twelve (12), but it can, in other applications, be more (20 to 30 for example). It is at least equal to 4 for functional reasons which will be explained hereinafter.

Figure 2:
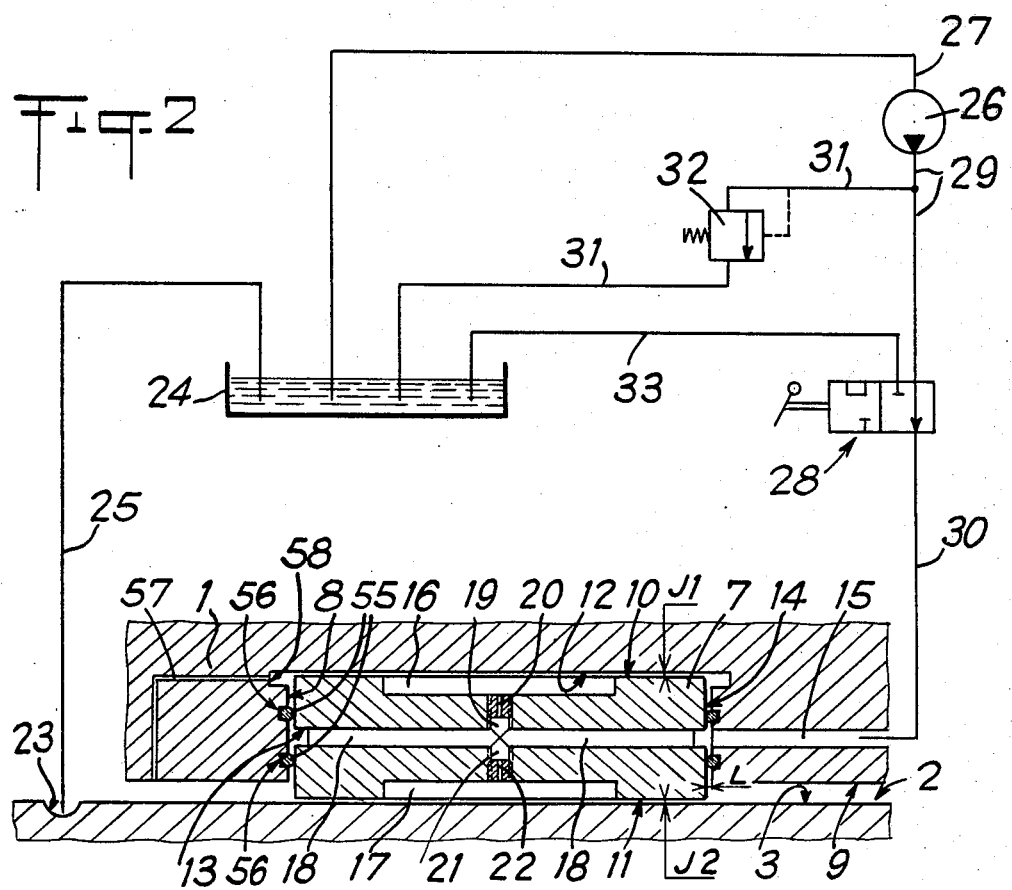
FIG. 2 is a cross-section of a hydrostatic guide-block used in accordance with the invention.

Referring to FIG. 2, it is noted that each guide-block 7 is constituted by a kind of a disc of circular cross-section, partly introduced in a corresponding cavity 8 provided in the face 9 of the body 1 which is placed opposite the face 3 of a guide way 2. The faces 10 and 11 of the guide-block 7 are arranged, respectively, opposite the bottom 12 of the cavity 8 and opposite the face 3 of the guide way. Clearances $J_1$ and $J_2$ are provided between the opposed faces, $J_1$ between the face 10 and the bottom 12, $J_2$ between the faces 3 and 11, each clearance containing a film of pressurized fluid.

A groove 13 is provided in the cylindrical face 14 of the guide-block, between the faces 10 and 11, and it communicates first with a pipe 15 made in the body 1 and permanently issuing opposite the groove 13, and second, with central chambers 16 and 17 provided in the guide-block and issuing into faces 10 and 11 respectively. The connection between the groove 13 and the chamber 16 is produced by radial pipes 18 and one axial pipe 19, on which is placed a restriction 20, in the same way, the connection between the groove 13 and the chamber 17 is produced by radial pipes 18 and one axial pipe 21, on which is placed a restriction 22.

A mean radial clearance L is moreover provided between the cylindrical faces 8 and 14 of the cavity of the guide-block and allows to guide the displacement of the guide-block 7 in the cavity. A fluid delivery means comprises two toroidal sealing joints 55 which are set in grooves 56 provided in the body 1, and between which the groove 13 is permanently situated. The said joints 55 ensure complete tightness between the cylindrical faces 8 and 14. In addition, a pipe 57 connects a groove 58 provided at the bottom of the cavity of the body 1 with the face 9 of the said body and, allows the flow of the fluid released through the clearance $J_1$ and arriving in said groove 58. Clearances $J_1$ and $J_2$ are of course small and their function is to cooperate to the production of the fluid films.

In known manner, the fluid which flows from the two fluid films is collected in a channel 23 in order to be returned to a fluid reservoir 24 through a pipe 25. A pump 26 (or a compressor in the case of pressurized gas-operated guide-blocks) is connected to the reservoir 24 by its suction pipe 27 and to a two-position distributor 28 by its delivery pipe 29. A pipe 30 connects the pipe 15 to the distributor 28, whilst a pipe 31 connects the delivery pipe 29 to the reservoir 24, a calibrated discharge valve 32 being provided on the pipe 31. A pipe 33 connects the distributor 28 to the reservoir 24.

The two positions of the distributor 28 correspond:
the first one to connecting the pipes 29 and 30 and to shutting off the pipe 33, and
the second one to connecting the pipes 29 and 33 and to shutting off the pipe 30.

Figure 3:
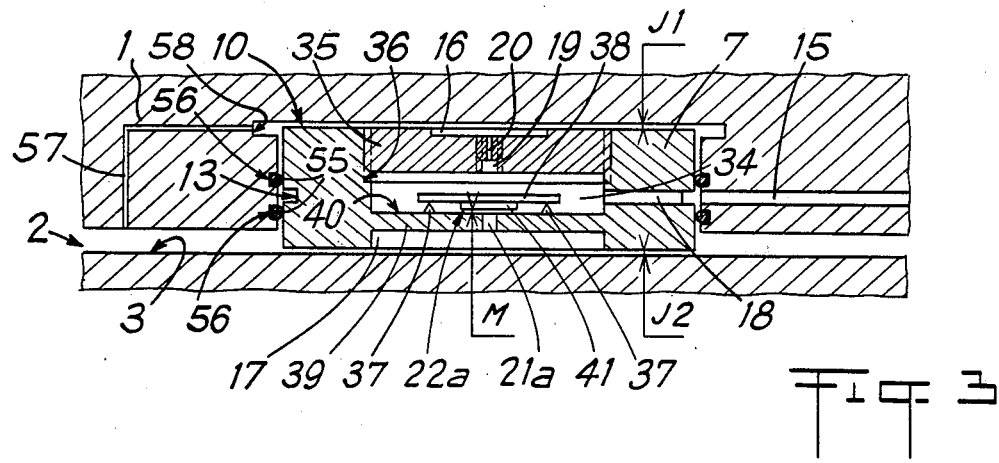
FIG. 3 is a cross-section of a variant of a guide-block according to the invention.

The embodiment shown in FIG. 3 repeats the arrangements shown in FIG. 2, except with regard to the position and/or to the constitution of the restrictions 20 and 22. It is noted that a cavity has been provided in the guide-block 7 and issues into the face 10 of the said guide-block, but that it is closed off by a threaded plug 35 screwed into a thread 36 of the cylindrical part of the cavity 34. The axial pipe 19, restriction 20 and chamber 16 are also found in the embodiment of FIG. 3, but they are provided in the plug 35, the pipe 19 connecting the cavity 34 to the chamber 16. Two ridges 37, provided on the inner face of the wall 39 separating the cavity 34 from the chamber 17, support a flexible metallic membrane 38. The restriction 22a provided on the pipe 21a which connects the cavity 34 to the chamber 17 is constituted by the small clearance M provided between the inner face 40 of the wall 39 into which issues the pipe 21a and by an extra thickness 41 which is integral with the middle of the membrane 38. The pipe 15 issues into the cavity 34.

Figure 4:
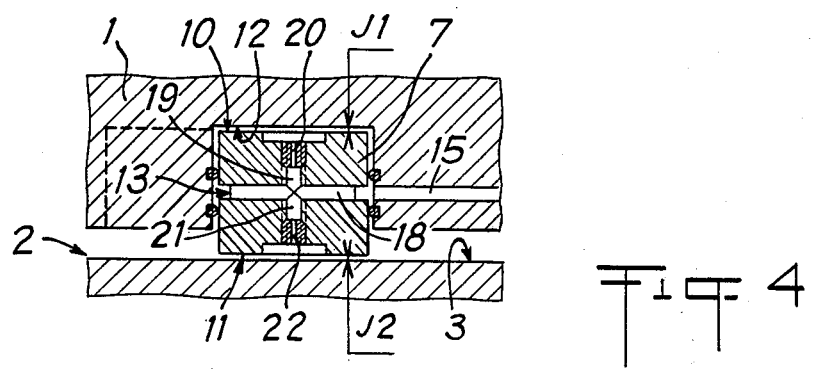
FIGS. 4 and 5 diagrammatically show two configurations of operation according, respectively to the invention and to the known prior art.
Figure 5:
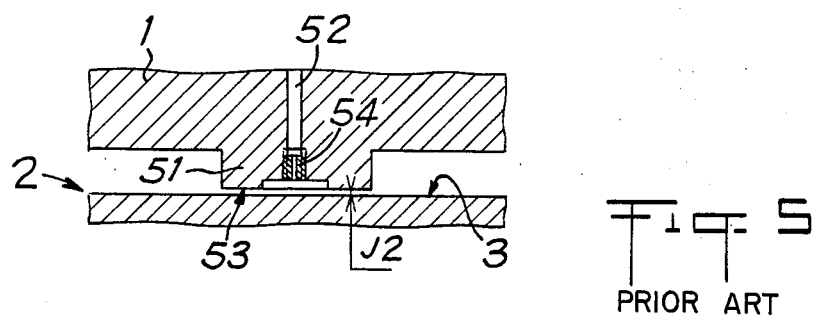

It is also well to make a comparison between the guiding rigidities obtained with a floating hydrostatic guide-block 7 such as that already described with reference to FIG. 2 and that described with reference to FIG. 4, and a rigid guide-block 51 integral with the body 1, of which the face 53 is placed opposite the face 3 of a guide way 2 (FIG. 5). The fluid is fed to the hydrostatic guide-block 51 via a pipe 52 on which is placed a restriction 54.

For the rest of the reasoning, the following assumptions are made:
the clearances $J_1$ and $J_2$ of the guide-block in FIG. 4 are equal and the rigidity of the fluid film which causes the face 10 of the guide-block 7 to rest on the bottom 12 is equal to the rigidity of the fluid film supporting the face 11 of the guide-block on the face 3 of the guide way, the common value of these rigidities being K;
the rigidity of the fluid film causing the face 53 of the guide-block 51 in FIG. 5 to rest on the face 3 of the guide way 2 is also equal to K.

With these values, the overall support rigidity $K_G$ of the portion of body 1 supported by the guide way 2 by means of the guide-block 7 in FIG. 4 is given by the standard formula:

$$1/K_G = 1/K + 1/K$$

from which the value $K_G$ is derived:

$$K_G = K/2$$

whereas the support rigidity of the body 1 on the guide way 2, via the guide-block 51 in FIG. 5 is K. The conclusion of this first calculation consists in noticing, (what is anyway mechanically obvious) that all the other conditions remaining anyway equal, the support rigidity, and therefore, the guiding performance, produced by a *single* guide-block, are less in the case of a "floating" or oscillating guide-block 7 than in the case of a guide-block 51 rigidly fastened on the body 1.

In the case of multiple guide-blocks, the adoption of guide-blocks of the "oscillating" type (guide-blocks 7) which by their very constitution are permanently resting on the guide way 2, reverses the preceding conclusion after a certain number of guide-blocks.

Thus for a number $N_o$ of oscillating guide-blocks 7 and a number $N_R$ of rigid guide-blocks 51 effectively supported (certain guide-blocks ceasing to be supported after bending or deflection of the operating guide way 2,) the overall rigidities become:

$$K/2 \times N_o$$

as far as all the "oscillating" guide-blocks are concerned, and $$K \times N_R$$

as regards all the "rigid" guide-blocks 51.

The adoption of "oscillating" guide-blocks is advantageous as far as the guiding performance is concerned, when:

$$K/2 \times N_o > K \times N_R$$

or else, when:

$$N_o > N_R$$

It can be admitted that the isostatic support conditions are nearly always met with three "rigid" guide-blocks, but that, on the contrary hyperstatic support conditions may appear with four (or more) "rigid" guide-blocks. By applying the preceding formula with $N_R = 3$, the minimal value of $N_o$ is obtained, wherefrom the adoption of "oscillating" guide-blocks 7 becomes advantageous:

$$N_o \text{minimal} > 2 \times 3$$

$$N_o \text{minimal} = 7$$

It is therefore in those installations which comprise at least seven "oscillating" guide-blocks similar to that shown in FIG. 2 where the guiding performance may be superior to that obtained in installations using only "rigid" guide-blocks.

This conclusion is slightly altered when "oscillating" guide-blocks as shown in FIG. 3 are used. Indeed, with such guide-blocks, the rigidity of the oil film corresponding to the clearance $J_2$ may be very high. The meaning of the previous comparison is however retained. It can be said that the installation which comprises at least four "oscillating" guide-blocks of this type is an advantageous one, because one is assured that all the guide-blocks will be supported, which is not the case with four (or more) "rigid" guide-blocks. Indeed, although it is always possible for a guiding plane to cross three "rigid" guide-blocks (geometrically, through three points), it is not always possible or even certain with a number of "rigid" guide-blocks above three. As a general conclusion, whatever the type of "oscillating" guide-blocks selected, it is with a minimum of four "oscillating" guide-blocks that the guiding performance is better than that previously obtained.

The choice of the "oscillating" guide-block from the embodiments shown in FIGS. 2 and 3 is dependent on the performances required.

In this way:
the guide-block shown in FIG. 2 ensures an hydrostatic reaction on the bottom 12 of the cavity 8 and, therefore, a complete hydrostatic performance of the guide-block 7, with regard to the main support between the faces 3 and 11 as well as with regard to the reaction support between the face 10 and the bottom 12;
the guide-block shown in FIG. 3 constitutes an improvement on that shown in FIG. 2 by permanently adapting the size of the clearance M and therefore, adapting the value of the restriction constituted by the latter, to the value of the pressure of the fluid film contained in the clearance $J_2$, the latter varying also whilst the guide-block is operating.

The invention is not limited to the embodiments shown, but on the contrary covers any variants which could be made thereto without departing from its scope or its spirit.

What is claimed is:

1. A guiding device comprising:

support means including a first substantially planar guiding surface;

a movable body adapted to be guided on said support means and including a second substantially planar guiding surface;

a plurality of hydrostatic guide blocks disposed between said first and second guiding surfaces, each said guide block including a first hydrostatic bearing portion connected to a source of pressurized fluid for slidably connecting one of said movable body and said support means to the respective guide block, each said first bearing portion including a flow restriction for restricting the flow of fluid from said source to the respective first bearing portion; a second hydrostatic bearing portion on said guide block connected to said source of pressurized fluid; and plural radial pipes connecting the outside of each respective guide block to the first and second hydrostatic bearing portions thereof; and a single pipe in said movable body associated with each of said guide blocks for connecting the source of pressurized fluid to means delivering said fluid to said plural radial pipes at the outside of each respective guide block.

2. A guiding device, comprising:

support means including a first substantially planar guiding surface;

a movable body adapted to be guided on said support means and including a second substantially planar guiding surface; and a plurality of hydrostatic guide blocks disposed between said first and second guiding surfaces, each said guide block including a first hydrostatic bearing portion connected to a source of pressurized fluid for slidably connecting one of said movable body and said support means to the respective guide block, each said first bearing portion including a flow restriction for restricting the flow of fluid from said source to the respective first bearing portion, a second hydrostatic bearing portion on said guide block connected to said source of pressurized fluid for slidably connecting the other of said movable body and said support means to said respective guide block, each said second bearing portion including a flow restriction for restricting the flow of fluid from said source to the respective second bearing portion, and plural radial pipes connecting the outside of each respective guide block to the first and second hydrostatic bearing portions thereof; and a pipe in said movable body associated with each of said guide blocks for connecting the source of pressurized fluid to means delivering said fluid to said plural radial pipes at the outside of each respective guide block.

* * * * *